(12) United States Patent
Miura

(10) Patent No.: US 6,877,479 B2
(45) Date of Patent: Apr. 12, 2005

(54) APPARATUS AND A METHOD FOR CONTROLLING AN INTERNAL COMBUSTION ENGINE

(75) Inventor: Manabu Miura, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 11 days.

(21) Appl. No.: 10/271,569

(22) Filed: Oct. 17, 2002

(65) Prior Publication Data

US 2003/0079716 A1 May 1, 2003

(30) Foreign Application Priority Data

Oct. 25, 2001 (JP) ........................................ 2001-327236

(51) Int. Cl.[7] .............................................. F02D 13/04
(52) U.S. Cl. ................... 123/319; 123/337.24; 123/299
(58) Field of Search ........................... 123/319, 337.24, 123/568.21, 299, 300, 478, 501; 60/285

(56) References Cited

U.S. PATENT DOCUMENTS

| 4,276,601 A | * | 6/1981 | Tokuda et al. .............. 701/115 |
| 4,312,038 A | * | 1/1982 | Imai et al. ................... 701/115 |
| RE32,140 E | * | 5/1986 | Tokuda et al. .............. 123/417 |
| 6,659,071 B2 | * | 12/2003 | LaPointe et al. ............. 123/299 |
| 6,684,852 B2 | * | 2/2004 | Wright et al. ................ 123/431 |

FOREIGN PATENT DOCUMENTS

| EP | 0949413 | 10/1999 |
| GB | 2344376 | 6/2000 |
| JP | 01155053 | 6/1989 |
| JP | 07180540 | 7/1995 |
| JP | 11148410 | 6/1999 |
| JP | 2000-145508 A | 5/2000 |

* cited by examiner

*Primary Examiner*—John T. Kwon
(74) *Attorney, Agent, or Firm*—Foley & Lardner LLP

(57) ABSTRACT

When an air excess rate is controlled to be reduced based upon an early activation demand of an exhaust gas purification apparatus or a regeneration demand of NOx trap catalyst at a state immediately after an engine has started from at a cold condition, a fuel injection state (injection timing of a main injection, a pilot injection quantity, an injection pressure and so on) from a fuel injection valve is variably controlled so that a crank angle position where a heat generation rate is maximized is kept constant, thereby stabilizing a combustion and preventing combustion fluctuations.

18 Claims, 19 Drawing Sheets

λ BASED CORRECTION QUANTITY OF TARGET INJECTION TIMING

EGR RATE BASED CORRECTION QUANTITY OF TARGET INJECTION TIMING

APPARATUS AND A METHOD FOR CONTROLLING AN INTERNAL COMBUSTION ENGINE

FIELD OF THE INVENTION

The present invention relates to a technology for stabilizing combustion performance in an engine when an air excess rate of a mixture supplied thereto is controlled to be reduced for an early activation of an exhaust gas purification catalyst and so on.

BACKGROUND OF THE INVENTION

A Japanese Unexamined Patent publication No. 2000-145508 discloses that combustion deterioration (combustion fluctuations) due to variations in an air excess rate is restricted by controlling a fuel injection timing based upon an output of a combustion pressure (cylinder pressure) sensor. The entire contents of this publication are incorporated herein by reference.

SUMMARY OF THE INVENTION

In the above earlier technology, it is not until the combustion fluctuations are detected by the combustion pressure sensor that the combustion fluctuations are restricted and as a result, the combustion fluctuations can not be prevented properly.

Even if the combustion fluctuations occur for a moment, it makes a driver feel uncomfortable.

As one aspect, the present invention properly prevents an occurrence of combustion fluctuations when reduction control of an air excess rate is performed.

Therefore, the present invention is provided with a fuel injection valve which directly injects fuel into a combustion chamber and a fuel injection state of which varies so that the fuel injection state is controlled corresponding to a demand for reduction of the air excess rate by a control unit to maintain a crank angle position where a heat generation rate in the combustion chamber is maximized constant.

The other objects and features of the present invention will be understood from the following description with accompanying drawings.

DETAILED DESCRIPTION OF THE EMBODIMENTS

Figure 1:
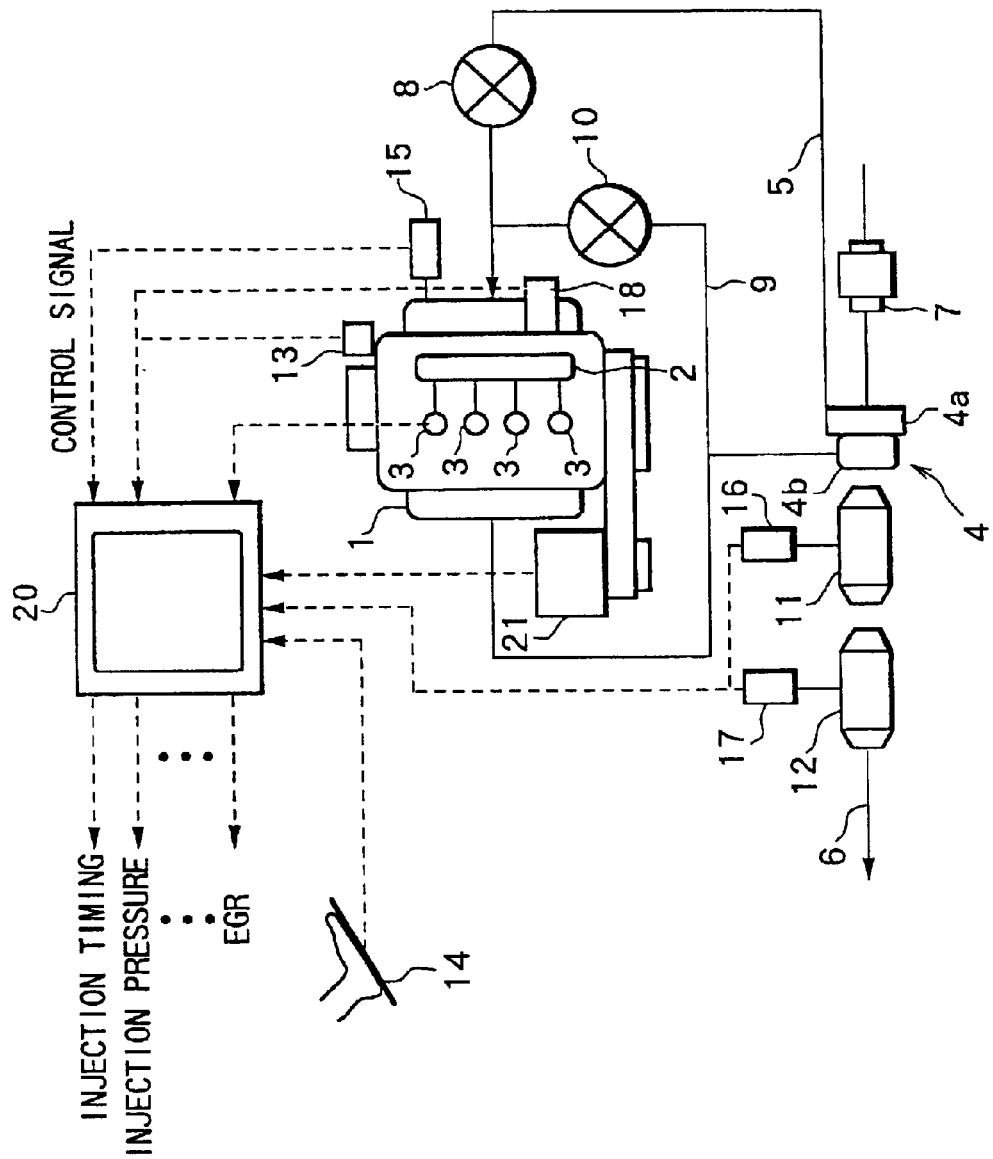
FIG. 1 is a system view according to an embodiment of the present invention.

FIG. 1 shows a system of a diesel engine with a supercharger equipped with a control apparatus according to the present invention.

As shown in FIG. 1, an engine body 1 includes a common rail fuel injection system comprising a common rail 2, fuel injection valves 3 and a fuel pump (not shown), which supply a highly pressurized fuel to engine body 1.

Fuel injection valves 3 directly inject fuel into a combustion chamber and enable a pilot injection prior to a main injection. A fuel injection pressure (hereinafter, injection pressure) of fuel injection valves 3 is controlled to vary by changing a fuel pressure set in common rail 2.

A compressor 4a of a supercharger 4 is connected to an intake passage 5 and is driven for supplying pressurized air into engine body 1.

A turbine 4b of supercharger 4 is connected to intake passage 5 and is driven by an exhaust gas from engine body 1 for driving compressor 4a.

In this embodiment, a variable volumetric type supercharger is used as supercharger 4 wherein at a low velocity region, a turbine efficiency improves by throttling a variable nozzle disposed in the side of turbine 4b and at a high velocity region, the variable nozzle opens to expand a turbine volume, thereby bring about a high supercharge effect in a wide operating region.

An air flow meter 7 arranged upstream of compressor 4a of supercharger 4 and an intake throttle valve 8 are disposed in intake passage 5.

Intake throttle valve 8 is an electronically controlled type valve an opening angle of which can vary by a step motor.

In an exhaust passage 6 are disposed an EGR passage 9 branched from between engine body 1 and turbine 4b of supercharger 4 and connected to intake passage 5, an EGR valve 10 inserted in EGR passage 9, and NOx trap catalyst 11 and an oxidizing catalyst 12 with HC absorption functions disposed downstream of turbine 4b of supercharger 4.

EGR valve 10 is an electrically controlled type valve using the step motor, which controls an exhaust gas quantity recirculated into the intake side corresponding to its opening angle, that is, an EGR quantity sucked into engine body 1.

NOx trap catalyst 11 traps and reduces NOx in the exhaust gases. Oxidizing catalyst 12 with HC absorption function absorbs HC in the exhaust gases at a low temperature and oxidizes HC and CO.

As sensors for detecting various conditions are disposed air flow meter 7 which detects an intake air quantity Qa, a rotation velocity sensor 13 which detects an engine rotation speed Ne, an acceleration opening angle sensor 14 which detects an acceleration opening angle, a water temperature sensor 15 which detects a water temperature Tw, a thermocouple 16,17 which detects a temperature of NOx trap catalyst 11 and oxidizing catalyst 12 with HC absorption function, a rail pressure sensor 18 which detects a fuel pressure in common rail 2 (i.e., fuel injection pressure of fuel injection valve 3), and the like.

A control unit 20 sets a fuel injection quantity Qf and a fuel injection timing IT based upon detection signals from various sensors and a detection signal from an auxiliary device 21 to control fuel injection valves 3 and also to control an opening angle of intake throttle valve 8 and EGR valve 10.

In an engine equipped with exhaust gas purification devices such as NOx trap catalyst 11 and oxidizing catalyst 12 with the HC absorption function, reduction of the air excess rate brings about rise of the exhaust gas temperature and a temperature of the exhaust gas purification devices which helps an activation of oxidizing catalyst 12, and also richness of an exhaust gas air fuel ratio enables regeneration of NOx trapped in NOx trap catalyst 11 by elimination and reduction reaction.

Figure 2:
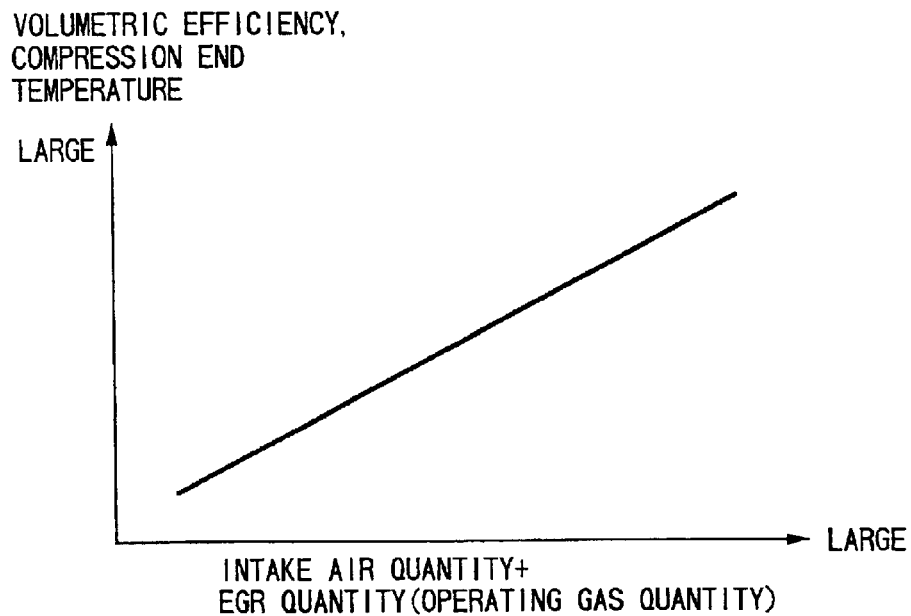
FIG. 2 is a view showing a relationship between an operating gas quantity and a volumetric efficiency, and a temperature at a top dead center during a compression stroke (compression end temperature).

Thus, in case a reduction of the air excess rate is required for a quick activation of the exhaust gas purification device and for regeneration demand of the NOx trap catalyst immediately after a cold engine start and, therefore the air excess rate is controlled to be reduced based upon the requirements (except change of the air excess rate due to change of engine operating conditions such as an engine rotation speed and an engine load), when an operating gas quantity (total quantity of the intake air quantity and the EGR quantity inside the cylinder) is reduced due to the reduction of the air excess rate, a temperature of the compression end (top dead center during compression stroke) is lowered as shown in FIG. 2.

When the compression end temperature is lowered, an ignition performance of the fuel deteriorates and a crank angle position (hereinafter, position) where the heat generation rate is maximized goes away from the top dead center during the compression stroke.

Figure 3:
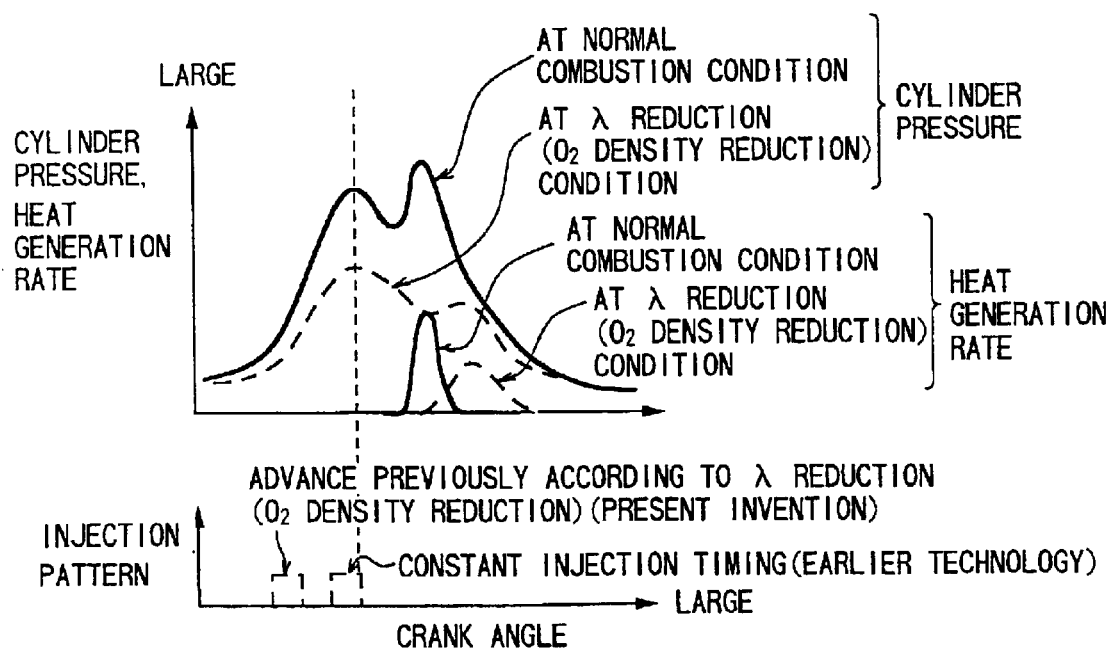
FIG. 3 is a view showing a relationship between a pressure inside a cylinder and a heat generation rate at a normal combustion state and at a reduction state of an air excess rate.

When the position moves too far, it brings about misfiring and combustion fluctuations (see FIG. 3). Therefore, when the air excess rate is reduced to increase the exhaust gas temperature for the quick activation of NOx trap catalyst 11 and oxidizing catalyst 12 with HC absorption function, and for the regeneration demand of NOx trap catalyst 11, according to the invention, an injection state of the fuel from fuel injection valves 3 is variably controlled such that the crank angle position where the heat generation rate is maximized is kept constant.

Thereby, the combustion is stabilized and the combustion fluctuations are prevented.

Figure 4:
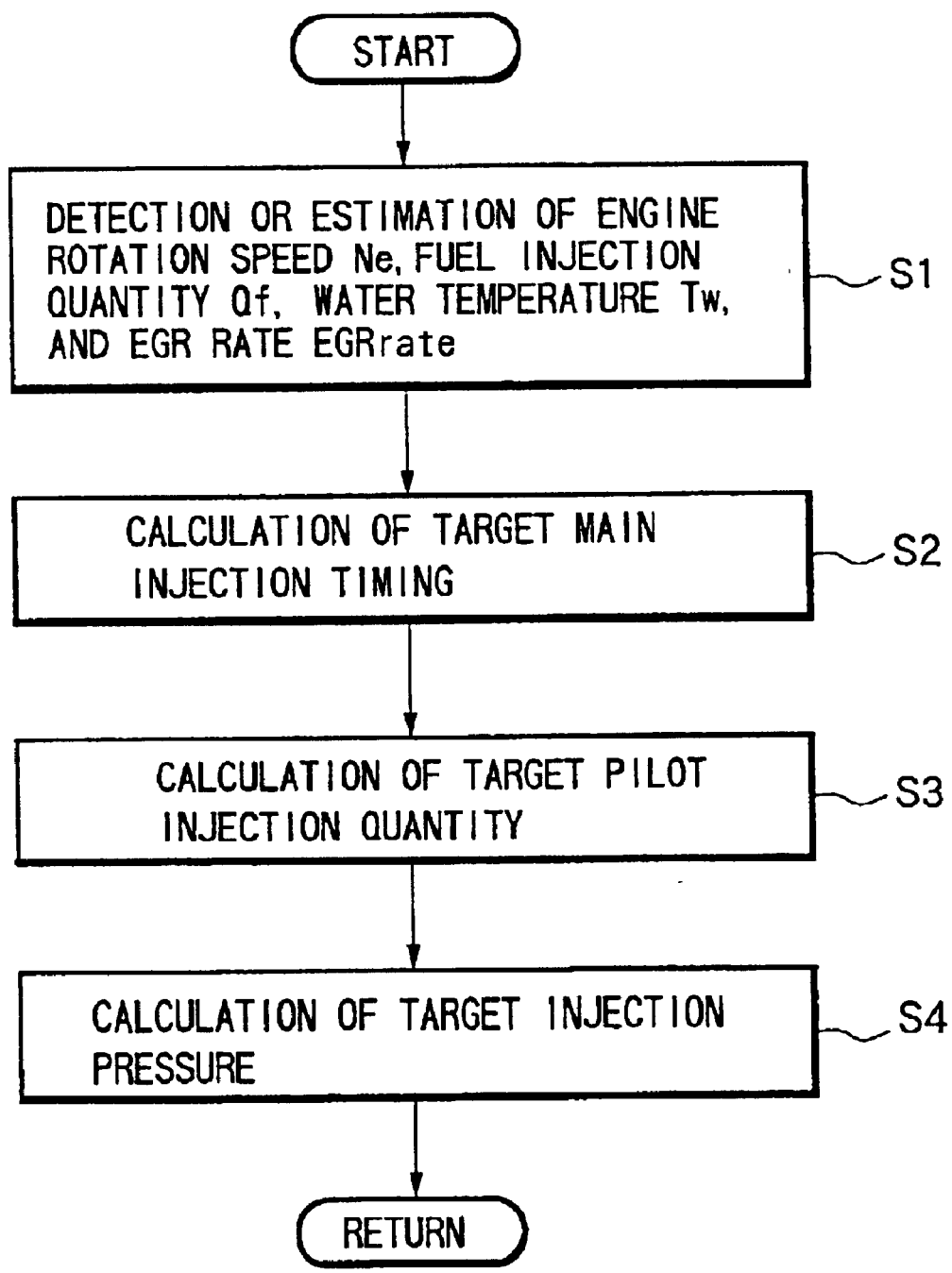
FIG. 4 is a flowchart showing a control routine according to a first embodiment.

Variable control of the fuel injection state will be explained according to a flow chart shown in FIG. 4 as follows.

At Step 1, the engine rotation speed Ne, the fuel injection quantity Qf, a cooling water temperature Tw, an actual air excess rate $\lambda$, and an actual EGR rate are detected or estimated. The air excess rate $\lambda$ will be calculated by the following equation based upon the intake air quantity Qac detected by air flow meter 7, the fuel injection quantity Qf, and a theoretical air-fuel rate (14.6).

$$\lambda = (Qac/Qf)/14.6$$

The actual EGR rate will be calculated by the following equation based upon the intake air quantity Qac, and the actual EGR quantity Qec [for example, calculated from an opening angle of an EGR valve (command value)].

$$EGR\ rate = Qec/Qac$$

At Step 2, a target main injection timing of a main injection of fuel injection valves 3 is calculated based upon these values and at Step 3, a target pilot injection quantity in a pilot injection prior to the main injection is calculated, and at Step 4, a target injection pressure is calculated.

The detail of the above control will be explained with reference to the drawings as follows.

Figure 5:
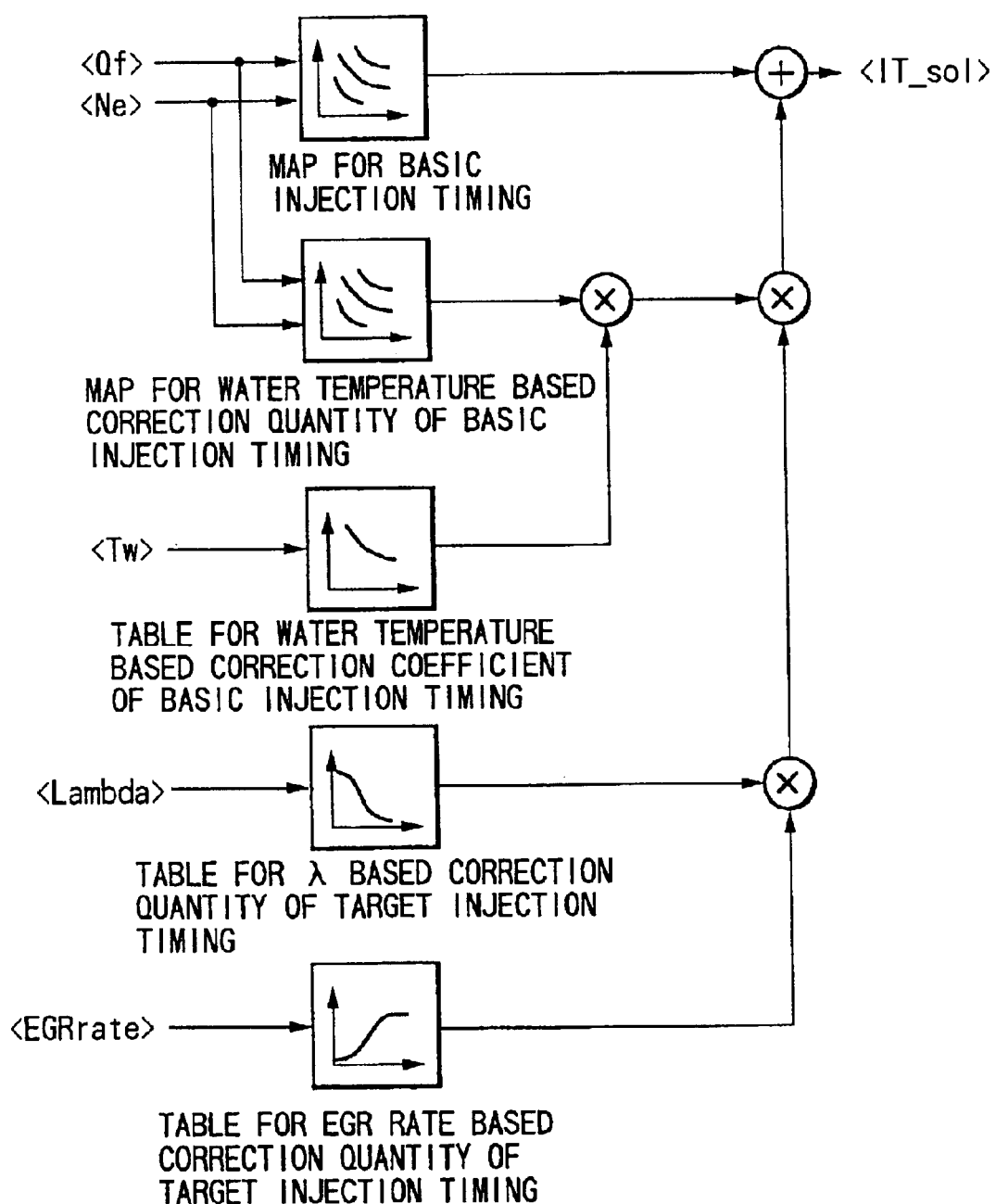
FIG. 5 is a calculation block diagram at a target main injection timing according to the first embodiment.

As for the target main injection timing, as shown in FIG. 5, basic injection timing is retrieved from a table map based upon a basic operating condition (fuel injection quantity Qf representing an engine load and engine rotation speed Ne). A final water temperature based correction quantity is calculated by multiplying a water temperature based correction quantity at the basic injection timing retrieved from the table map based upon the operating condition (Qf, Ne) by a water temperature based correction coefficient retrieved from a table map based upon the water temperature Tw.

Figure 6:
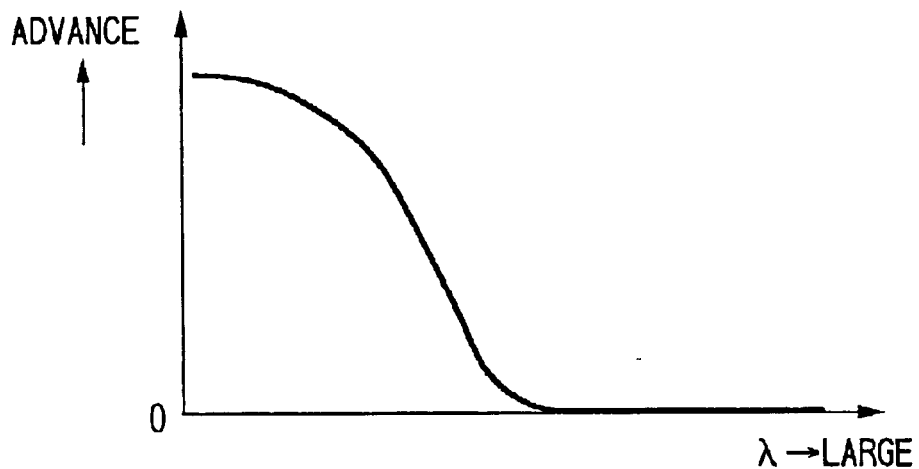
FIG. 6 is a table map of a correction quantity, based upon the air excess rate, to main injection timing for use in calculation of the target main injection timing according to the first embodiment.
Figure 7:
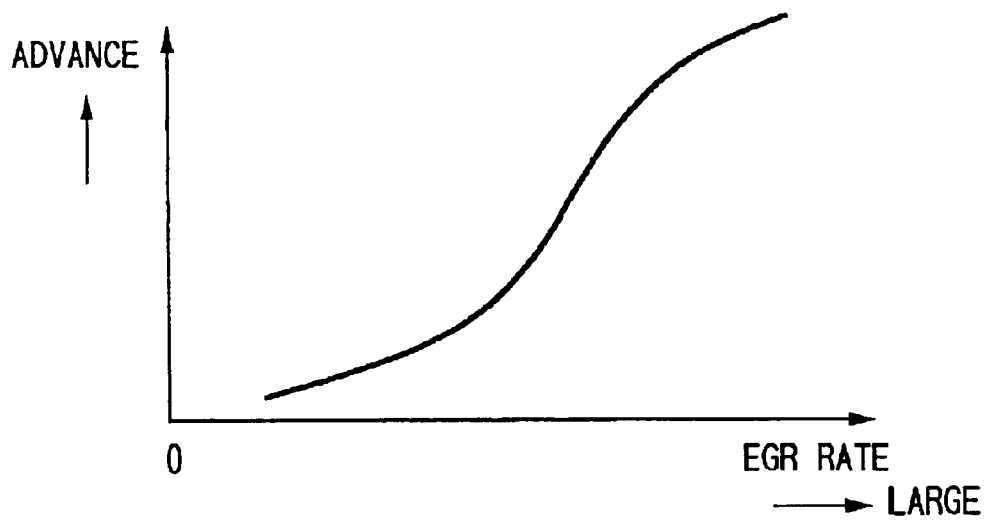
FIG. 7 is a table map of a correction quantity, based upon an EGR rate, to the main injection timing for use in calculation of the target main injection timing according to the first embodiment.

A $\lambda$ based correction quantity of the target injection timing is retrieved from a table map (FIG. 6) based upon the actual air excess rate $\lambda$ likewise, and an EGR rate based correction quantity of the target injection timing is retrieved from a table map (FIG. 7) based upon the actual EGR rate.

Then, the target main injection timing IT_sol is calculated by adding a product of these correction quantities to the basic injection timing.

The target main injection timing IT_sol is corrected in the advance direction further as much as the actual air excess rate $\lambda$ decreases or the actual EGR rate increases.

Figure 8:
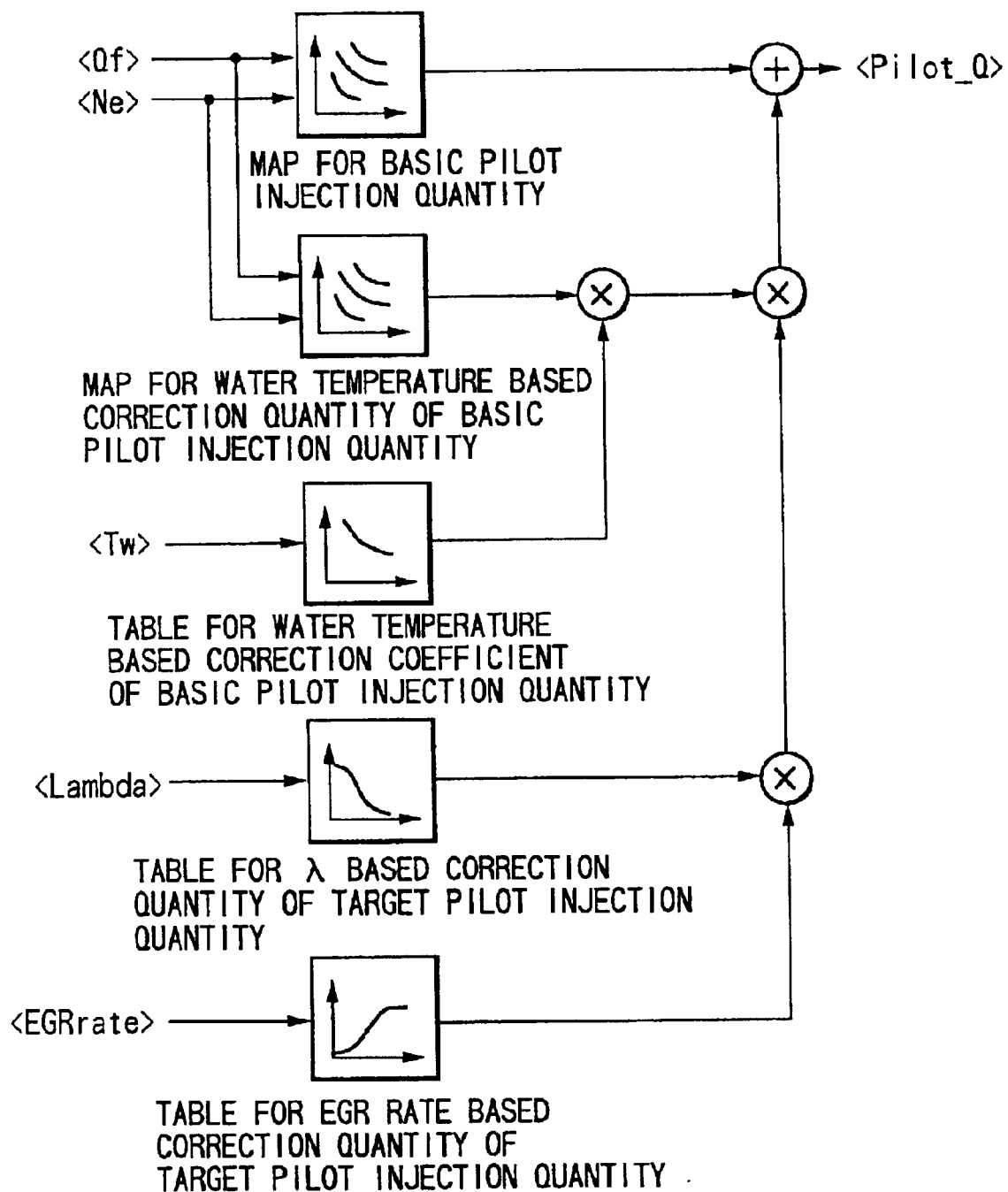
FIG. 8 is a calculation block diagram of a target pilot injection quantity according to the first embodiment.

As for the target pilot injection quantity, as shown in FIG. 8, in the same manner as the calculation of the target main injection timing, a basic pilot injection quantity is retrieved from a table map based upon a basic operating condition (fuel injection quantity Qf representing an engine load and engine rotation speed Ne). A final water temperature based correction quantity is calculated by multiplying a water temperature based correction quantity at the basic injection quantity retrieved from the table map based upon the operating condition (Qf, Ne) likewise by a water temperature based correction coefficient retrieved from a table map based upon the water temperature Tw.

Figure 9:
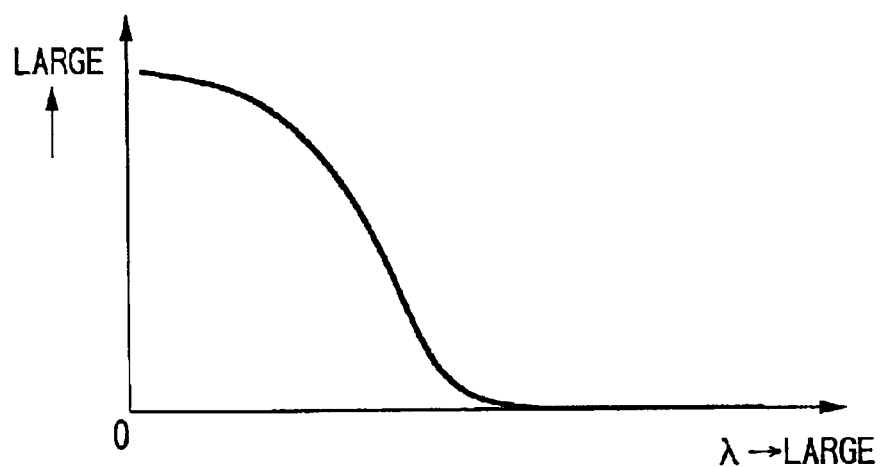
FIG. 9 is a table map of a correction quantity, based upon the air excess rate, to a pilot injection quantity for use in calculation of the target pilot injection quantity according to the first embodiment.
Figure 10:
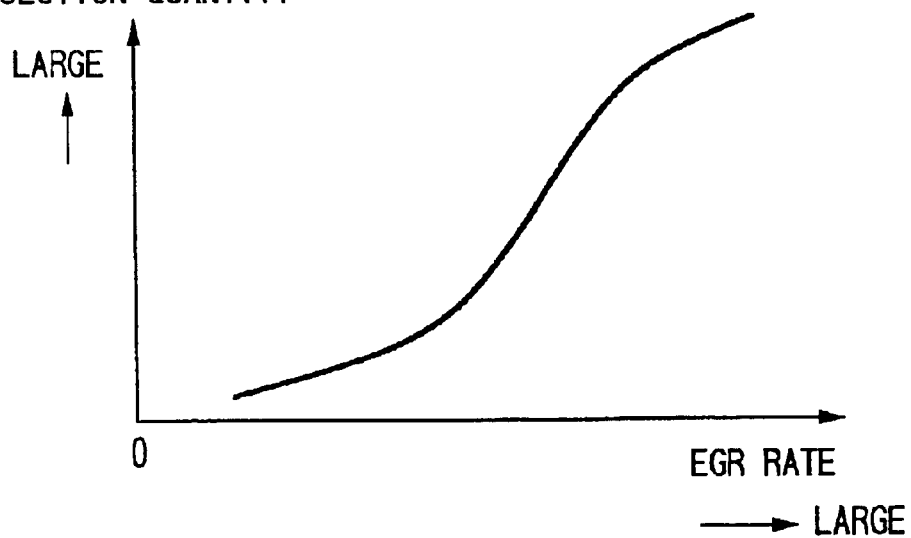
FIG. 10 is a table map of a correction quantity, based upon an EGR rate, to the pilot injection quantity for use in calculation of the target pilot injection quantity according to the first embodiment.

A λ based correction quantity of the target pilot injection quantity is retrieved from a table map (FIG. 9), and an EGR rate correction quantity of the target pilot injection quantity is retrieved from a table map (FIG. 10).

Then, a target pilot injection quantity is calculated by adding a total correction quantity multiplied by these correction quantities to the basic pilot injection quantity.

The target pilot injection quantity is increasingly corrected by a large margin as much as the actual air excess rate λ decreases or the actual EGR rate increases.

Figure 11:
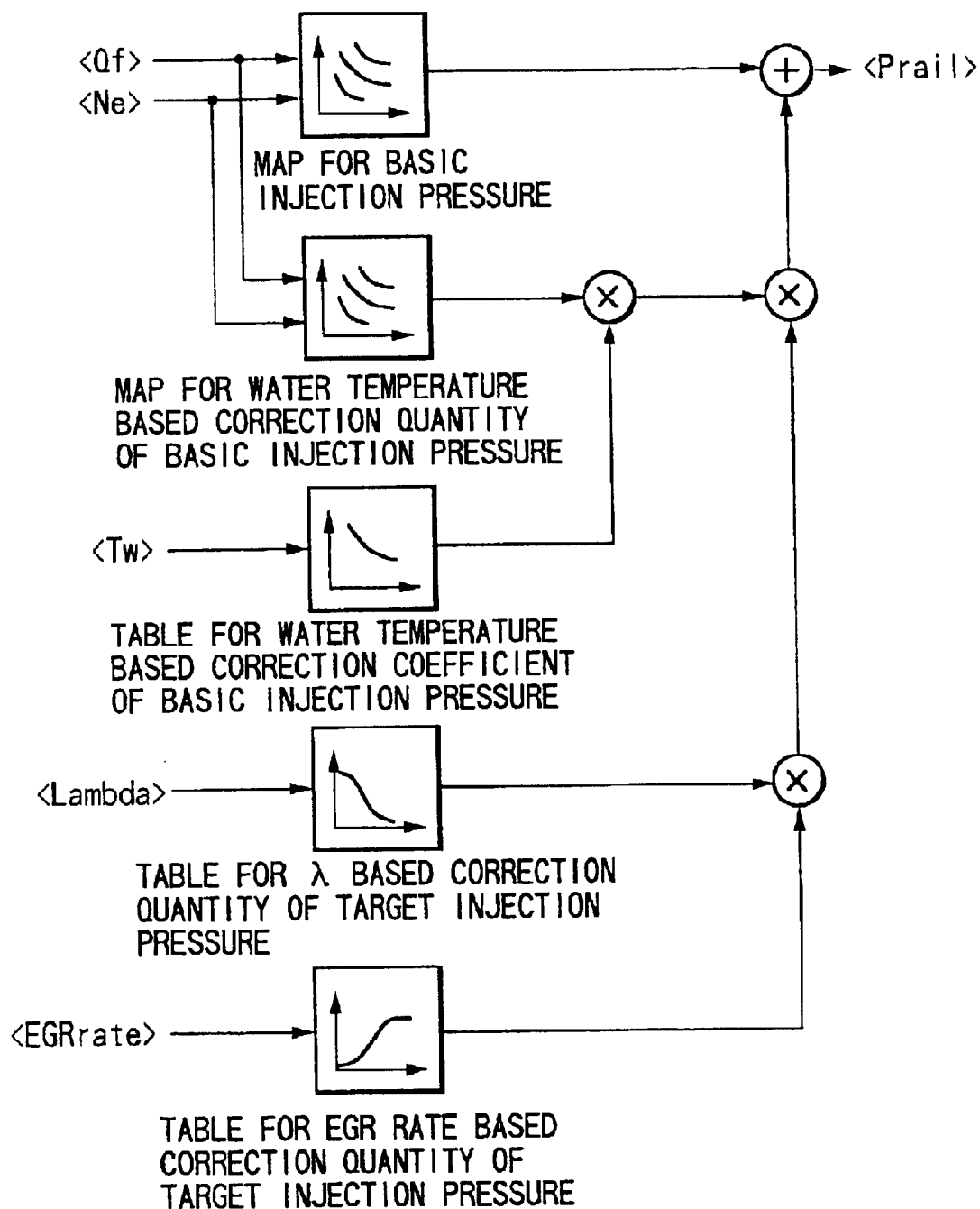
FIG. 11 is a calculation block diagram of the target pilot injection quantity according to the first embodiment.

As for the target injection pressure, as shown in FIG. 11, in the same as the calculation of the target main injection timing, a basic injection pressure is retrieved from a table map based upon a basic operating condition (fuel injection quantity Qf representing an engine load and engine rotation speed Ne). A final water temperature based correction quantity is calculated by multiplying a water temperature based correction quantity at the basic injection pressure retrieved from the table map by a water temperature based correction coefficient.

Figure 12:
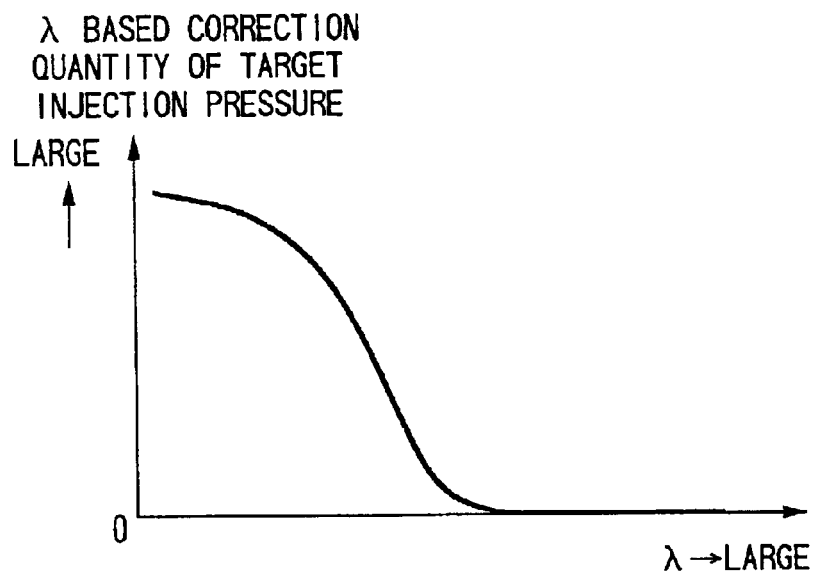
FIG. 12 is a table map of a correction quantity, based upon the air excess rate, to an injection pressure for use in calculation of a target injection pressure according to the first embodiment.
Figure 13:
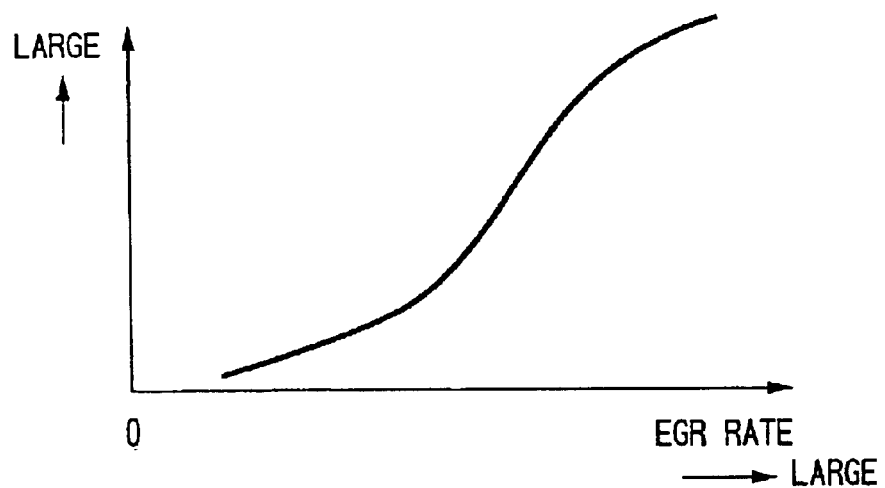
FIG. 13 is a table map of a correction quantity, based upon the EGR rate, to the injection pressure for use in calculation of the target injection pressure according to the first embodiment.

A λ based correction quantity of the target injection pressure is retrieved from a table map (FIG. 12), and an EGR rate correction quantity of the target injection pressure is retrieved from a table map (FIG. 13).

Then, a target injection pressure is calculated by adding a total correction quantity multiplied by these correction quantities to the basic injection pressure.

The target injection pressure is increasingly corrected by a large margin as much as the actual air excess rate λ decreases or the actual EGR rate increases.

An on-off switching of the fuel injection valve and the common rail pressure are controlled for the target main injection timing, the target pilot injection quantity, and the target injection pressure as above.

As a result, although, without the above controls, the ignition performance deteriorates due to reduction of the operating gas quantity and the crank angle position where the heat generation rate is maximized is getting away from the top dead center during compression stroke by lowering the combustion temperature due to reduction of the oxygen density, the crank angle position gets close to the top dead center during compression stroke to maintain the position within a certain range by increasing the advance correction quantity of the main injection timing, the correction quantity of the target pilot injection quantity, and the correction pressure of the target injection pressure. Therefore, the combustion fluctuations can be restricted properly.

Namely, the advance of the main injection timing and the increase pressure of the injection pressure guarantee the fuel injection quantity at a point when a compression temperature rises up, and the increase quantity of the pilot injection quantity brings about an increase quantity of a complimentary mixture quantity to improve the ignition performance and shorten an ignition delay period.

Accordingly, since carburetion of the fuel is delayed due to lowering the air excess rate and increasing the EGR rate in addition thereto, the ignition delay period lengthens.

However, by the advance of the main injection timing, the increase of the pilot injection quantity, and the increase of the injection pressure, rise of the combustion pressure quickens. As a result, the crank angle position where the heat generation rate is maximized can be controlled to be kept at the same position.

Not all of the main injection timing advance, the pilot injection quantity increase, and the injection pressure increase are necessary, but at least one of them may be used.

According to the above, since the crank angle position where the heat generation rate is maximized is kept constant in spite of reduction of the air excess rate, the combustion performance becomes stable and the misfire is prevented. Therefore, the combustion fluctuations can be prevented properly.

In the above first embodiment, on calculation of the target main injection timing, target pilot injection quantity, and the target injection pressure, the corrections are made based upon the air excess rate and the actual EGR rate, but it is not limited thereto, and in the second embodiment, the collections are based upon the air excess rate and the actual EGR quantity.

This is because there are some cases where the operating gas quantity (or compression end temperature) differs regardless of the same air excess rate.

For example, comparing when the air excess rate is reduced only by throttle valve control with when the air excess rate is reduced only by the EGR valve control, the operating gas quantity gets larger in the case of the EGR valve control only. Therefore, the control is performed corresponding to an accurate operating gas quantity that allows for the air excess rate and also the actual EGR quantity.

Figure 14:
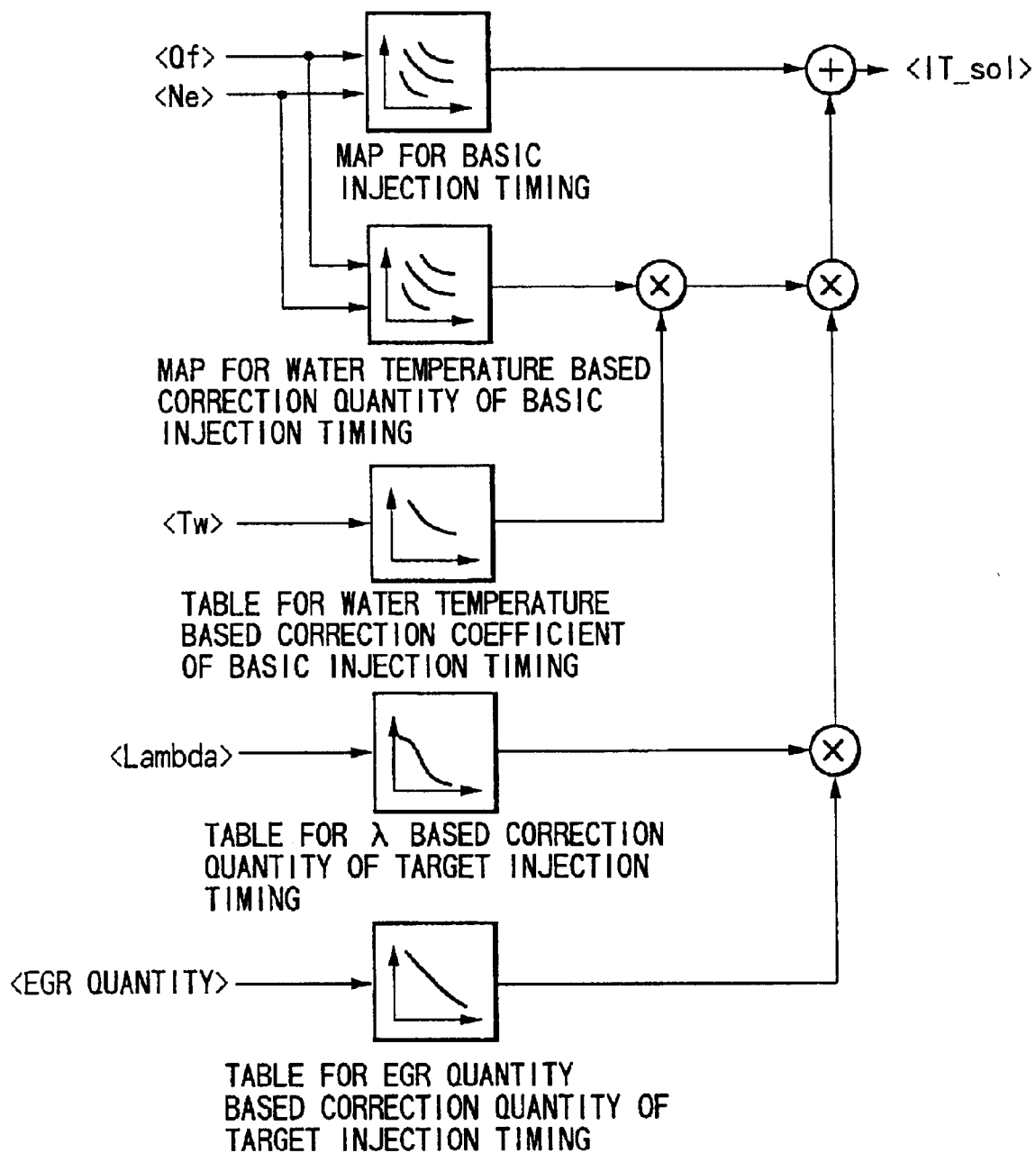
FIG. 14 is a calculation block diagram of target main injection timing according to a second embodiment.

In detail, the target main injection timing is calculated as shown in FIG. 14.

Firstly, the basic injection timing, the water temperature based correction quantity of the basic injection timing, and the λ based correction quantity of the target injection timing are calculated in the same way as the first embodiment and also the EGR quantity based correction quantity of the target injection timing (namely, the EGR quantity based correction quantity becomes smaller as the actual EGR quantity gets larger) is calculated based upon the actual EGR quantity (estimated value or detection value). A total correction quantity multiplied by these three correction quantities is added to the basic injection timing to calculate the target injection timing.

In this case, the main injection timing, in view of the ignition performance, is corrected to advance since the operating gas is reduced as the actual air excess rate is reduced. However, since when the actual EGR quantity is large at the same time, the reduction quantity of the total operating gas quantity is small, the main injection timing is corrected not to advance so much as compared with the small EGR quantity (namely, the advance correction quantity based upon the actual air excess rate is made small).

Figure 15:
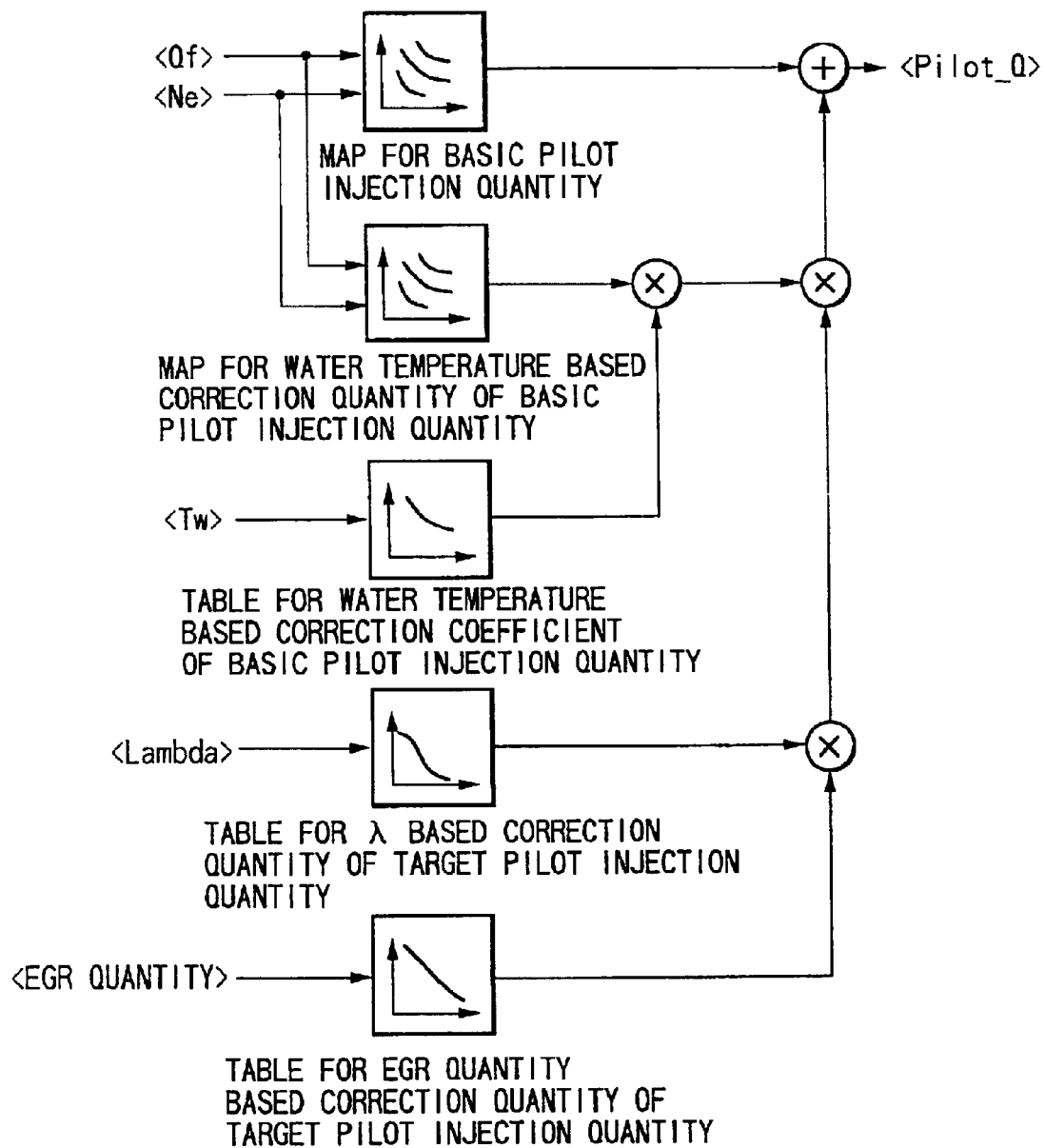
FIG. 15 is a calculation block diagram of a target pilot injection quantity according to the second embodiment.
Figure 16:
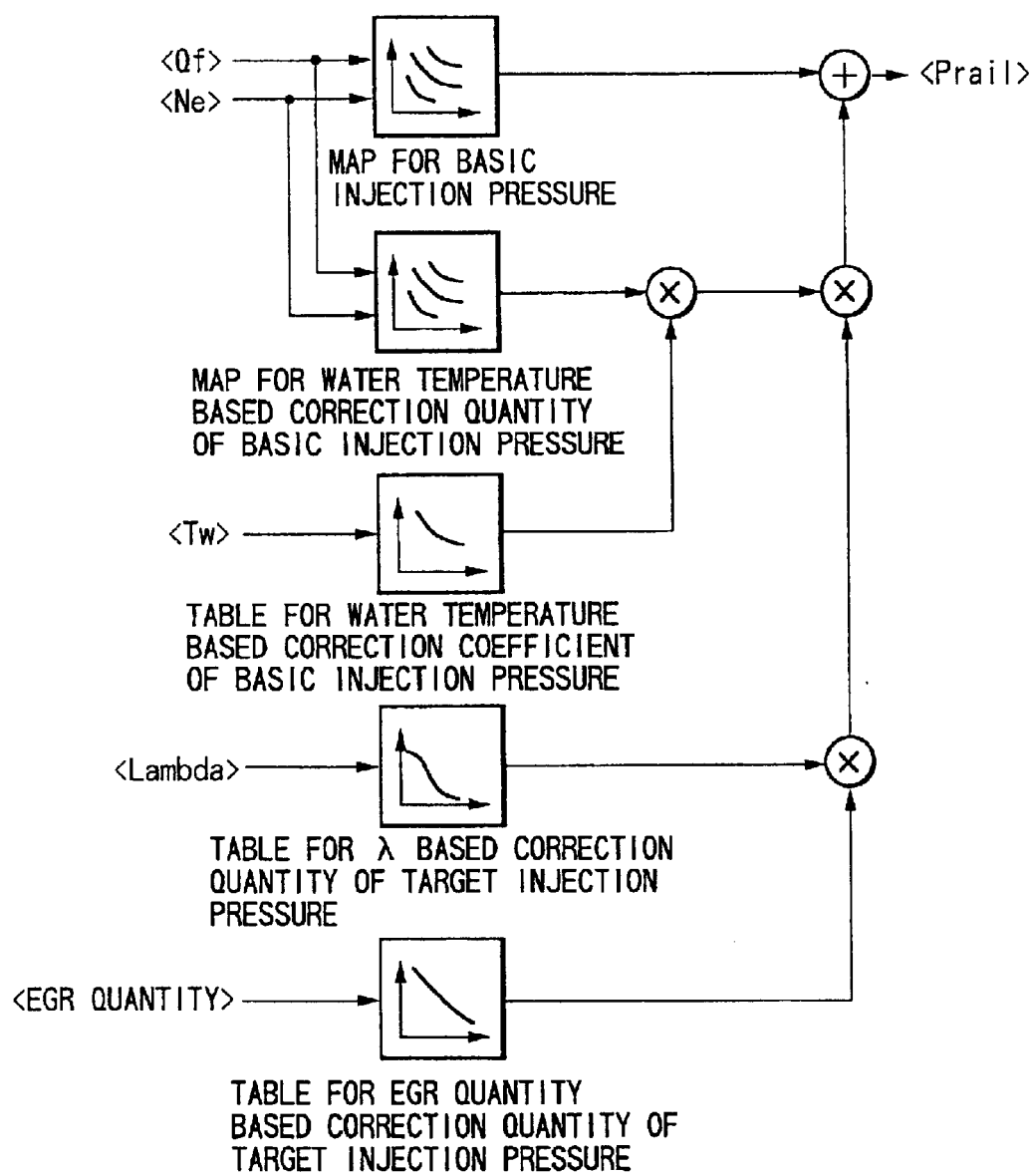
FIG. 16 is a calculation block diagram of a target injection pressure according to the second embodiment.

A calculation of the pilot injection quantity and the injection pressure is made in the same way as the above and, as shown in FIG. 15 and FIG. 16, since reduction of the operating gas quantity becomes smaller as the actual EGR quantity is larger, the pilot injection quantity and the injection pressure are respectively corrected to be reduced.

Thus, corresponding to the air excess rate, as well as the EGR quantity determined by the EGR valve control (when the EGR quantity increases even if the air excess rate decreases, the control to reverse it is performed), the crank angle position where the heat generation is maximized can be kept at the same position more accurately.

Not all controls of the main injection timing delay, the pilot injection quantity reduction, and the injection pressure reduction to the actual EGR quantity need to be performed, but at least one of them must be performed thereto.

In a third embodiment, a correction is made based upon the air excess rate and the oxygen density. This is because there are some cases where the combustion velocity differs when the oxygen density inside a cylinder differs, regardless of the same air excess rate.

For example, as the oxygen density is lowered, an oxidizing reaction is more difficult to occur, and as a result, the combustion velocity decreases. When the combustion velocity slows down, a waveform of the heat generation rate gets gentle (FIG. 3), wherein the crank angle position where the heat generation rate is maximized is getting away from the top dead center during a compression stroke. Therefore, the control is performed allowing for the air excess rate and also the oxygen density.

Figure 17:
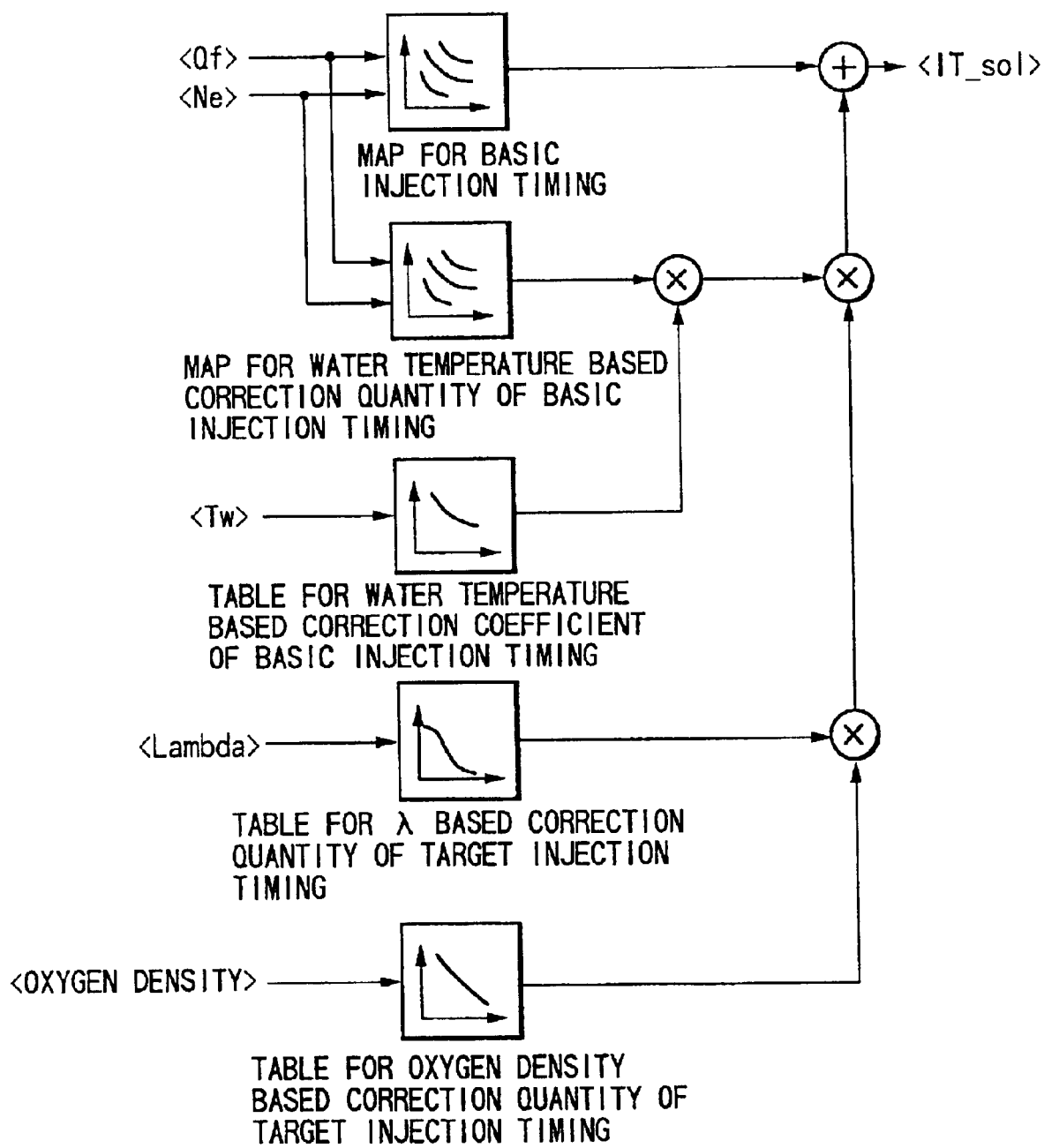
FIG. 17 is a calculation block diagram of target main injection timing according to a third embodiment.

In detail, the target main injection timing is calculated as shown in FIG. 17.

Firstly, the basic injection timing, the water temperature based correction quantity of the basic injection timing, and the λ based correction quantity of the target injection timing are calculated in the same way as the first embodiment and the second embodiment, and also the oxygen density based correction quantity of the target injection timing (namely, the oxygen density based correction quantity becomes larger as the oxygen density is lowered) is calculated based upon the oxygen density (estimated value or detection value). A total correction quantity multiplied by these three correction quantities is added to the basic injection timing to calculate the target injection timing.

In this embodiment, the main injection timing, in view of the ignition performance, is corrected to advance since the operating gas is reduced more as the actual air excess rate is reduced and, in view of the combustion velocity, the main injection timing is corrected more to advance as the oxygen density is lowered.

Figure 18:
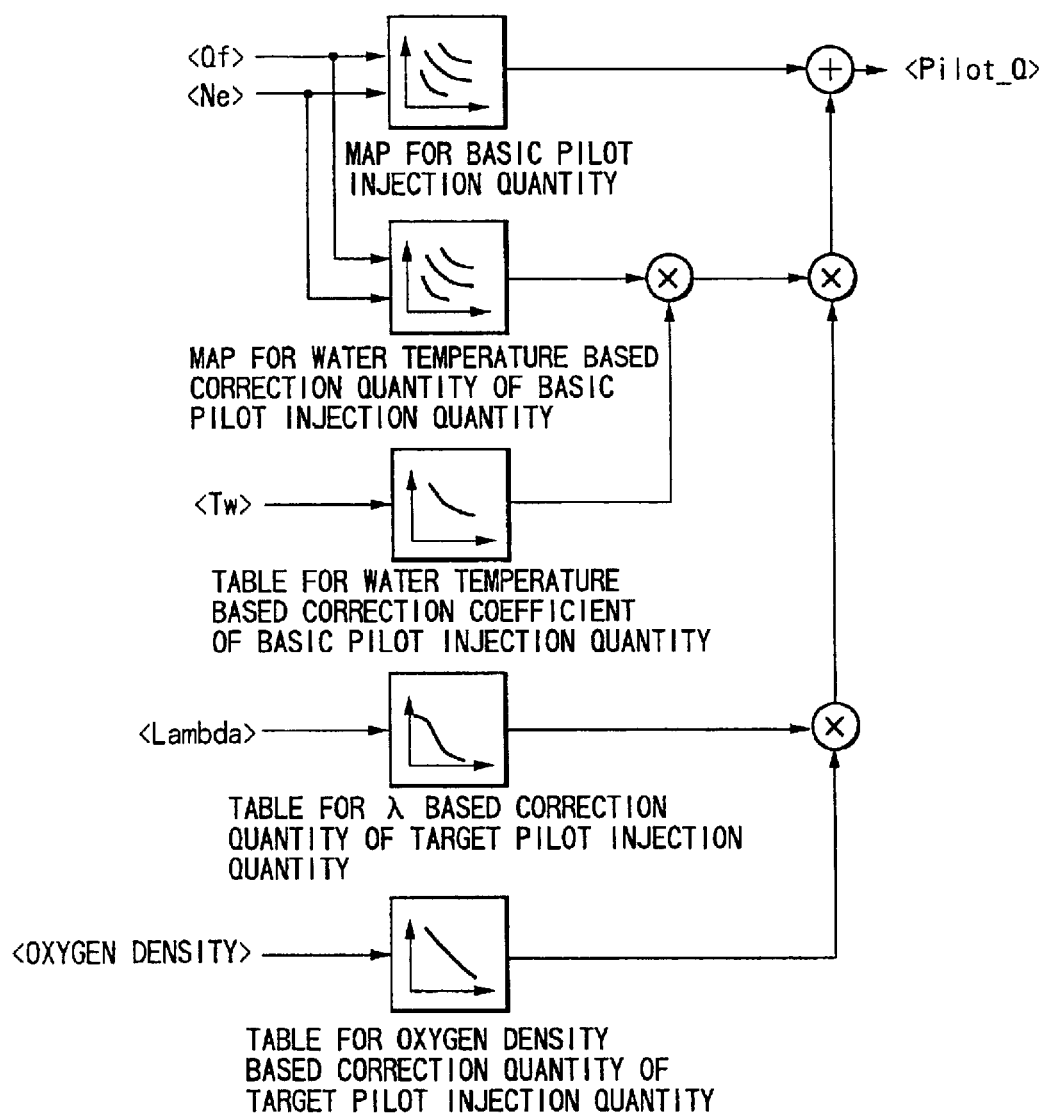
FIG. 18 is a calculation block diagram of a target pilot injection quantity according to the third embodiment.
Figure 19:
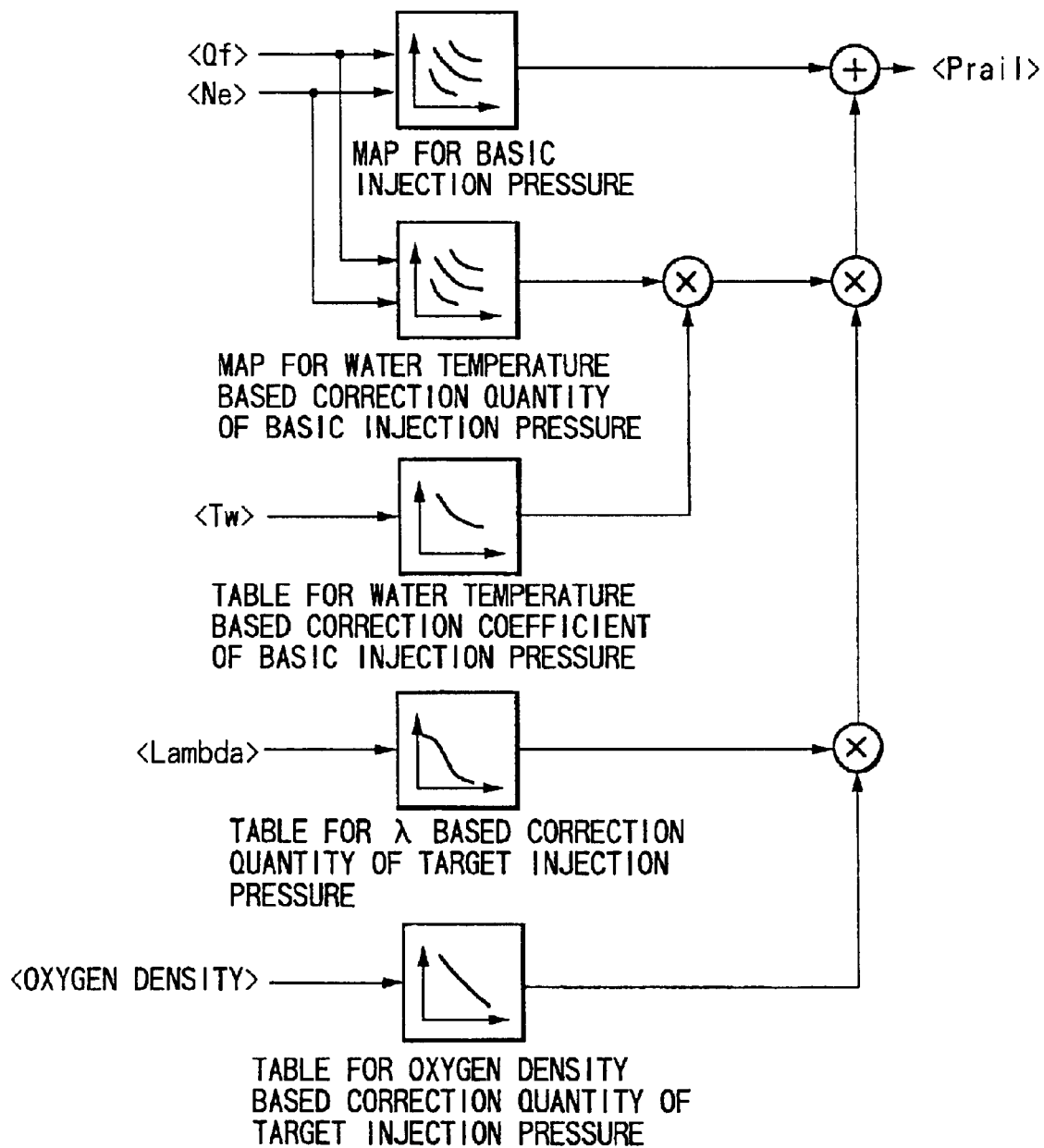
FIG. 19 is a calculation block diagram of a target injection pressure according to the third embodiment.

A calculation of the pilot injection quantity and the injection pressure is made in the same way as the above and, as shown in FIG. 18 and FIG. 19, since the ignition performance is lowered more as the oxygen density is lowered, the pilot injection quantity and the injection pressure are respectively corrected to be increased.

Thus, the correction made based upon the oxygen density in addition to the air excess rate indicates that deviations in the heat generation rate due to decrease of the compression end temperature by the reduction of the oxygen density and due to slowing down the combustion velocity are corrected. Therefore, the crank angle position where the heat generation rate is maximized can be kept at the same position more accurately.

Figure 20:
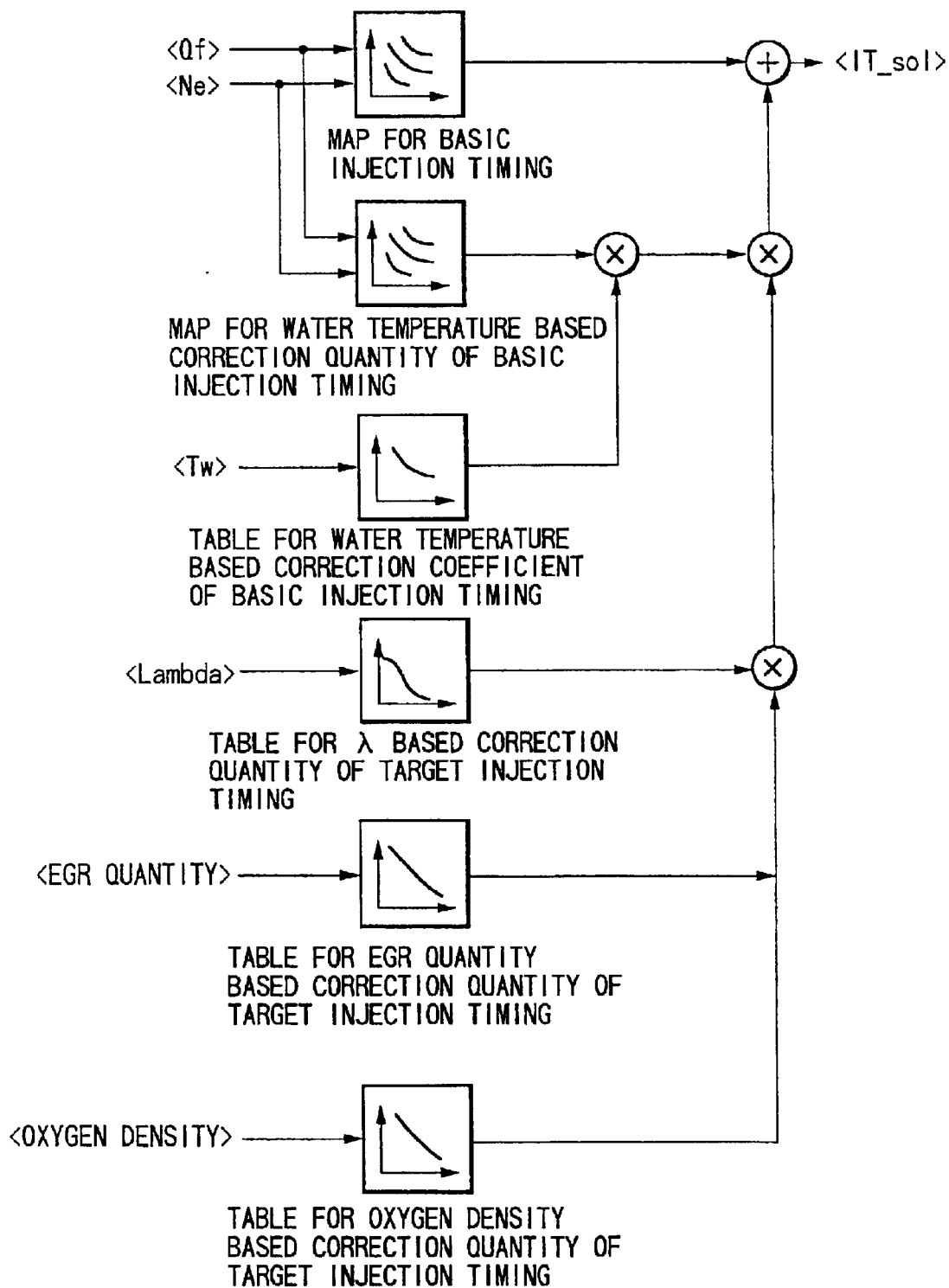
FIG. 20 is a calculation block diagram of target main injection timing according to a fourth embodiment.
Figure 21:
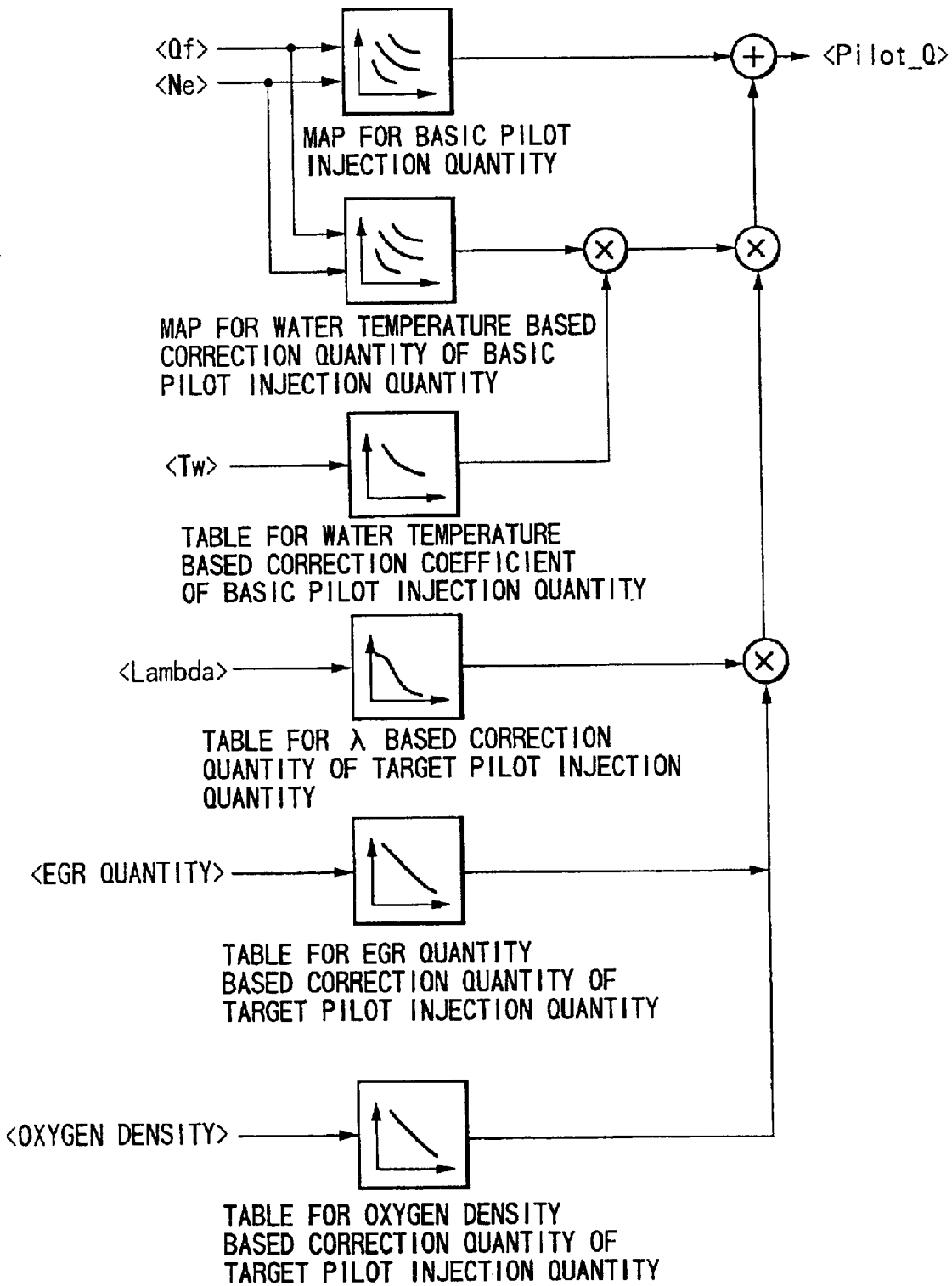
FIG. 21 is a calculation block diagram of a target pilot injection quantity according to the fourth embodiment.
Figure 22:
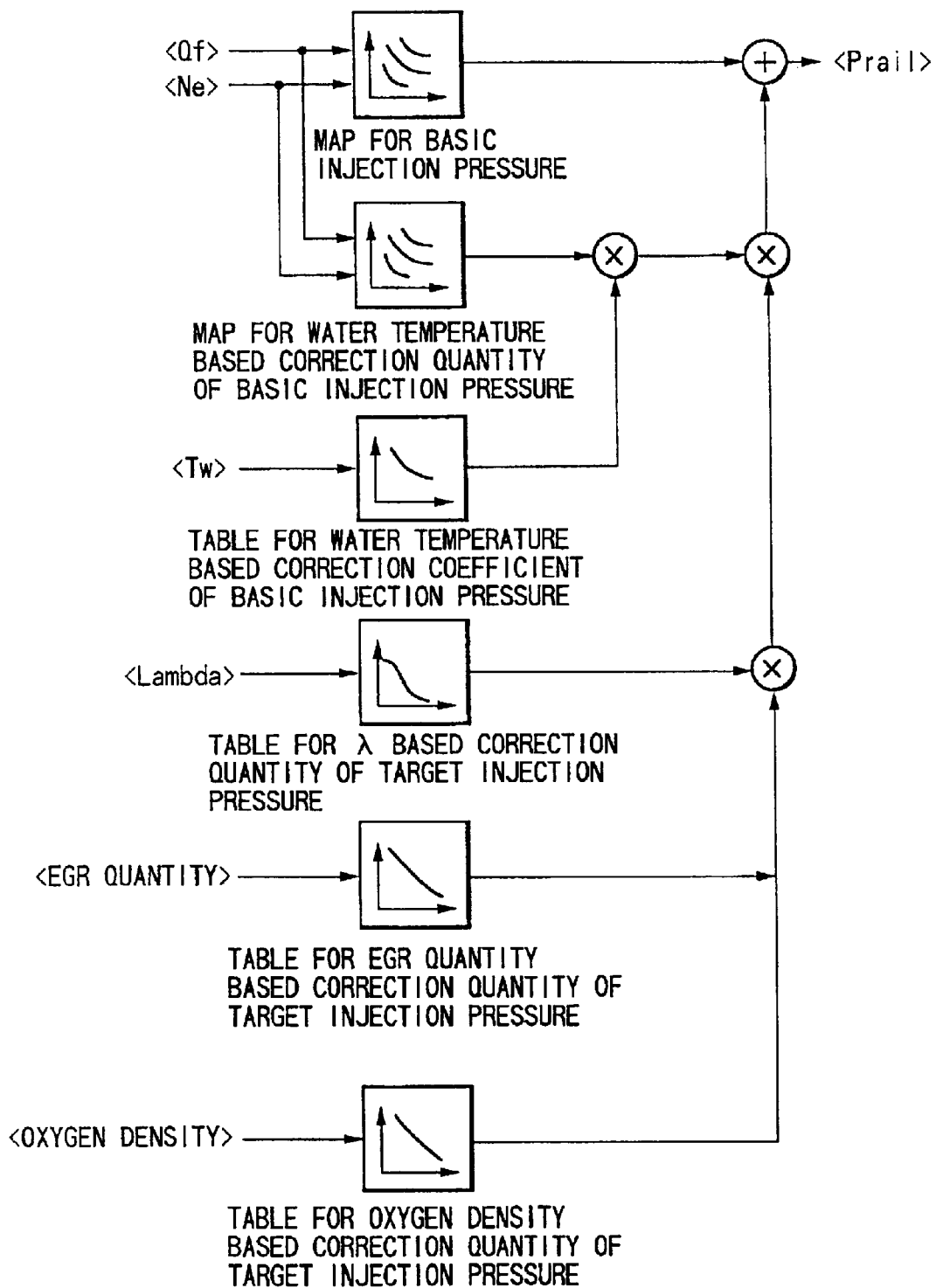
FIG. 22 is a calculation block diagram of a target injection pressure according to the fourth embodiment.

Moreover, a correction may be made based upon the air excess rate, the actual EGR quantity, and oxygen density. FIG. 20–FIG. 22 show a fourth embodiment in regard to the correction based upon the air excess rate, the actual EGR quantity, and the oxygen density.

In this embodiment, the main injection timing, in view of the ignition performance, is corrected to advance corresponding to the reduction of the air excess rate, and is corrected to retard corresponding to the reduction quantity of the operating gas being small when the actual EGR quantity at that moment is large (the advance correction quantity based upon the actual air excess rate is made small) and, in view of the combustion velocity, the main injection timing is corrected more for advance as the oxygen density is lowered.

A calculation of the target pilot injection quantity and the target injection pressure is made in the same way as the above and, as shown in FIG. 21 and FIG. 22, as the oxygen density is lowered, the target pilot injection quantity and the target injection pressure are respectively corrected to be increased.

In the first embodiment explained first, the air excess rate and the actual EGR rate are used for the correction in place of the air excess rate, the actual EGR quantity, and the oxygen density. This is because the actual EGR rate has a relationship with the actual EGR quantity and the oxygen density.

Namely, in fact, the intake air quantity and the EGR rate are determined based upon demands from the engine operating condition and the exhaust gas purification apparatus. Since EGR rate=EGR quantity/intake air quantity, the EGR quantity is determined from the EGR rate and the intake air quantity.

Figure 23:
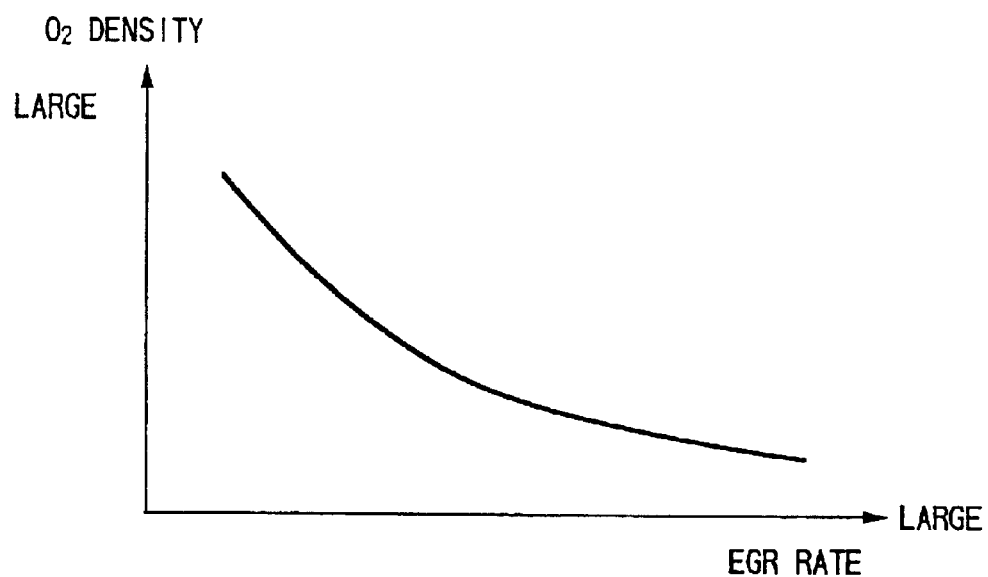
FIG. 23 is a view showing a relationship between an EGR rate and an oxygen density.

As shown in FIG. 23, the EGR rate has an inversely proportional relationship with the oxygen density, a determination of the EGR rate directly leads to the oxygen density. Namely, when the EGR rate is found out, the EGR quantity and the oxygen density are found out. Then, using the relationship shown in the fourth embodiment, the main injection timing, the pilot injection quantity, and the injection pressure can be controlled.

In the case of the calculation of the target main injection timing, when the actual EGR rate gets large, the correction quantity is equal to a total correction quantity of a retard correction quantity based upon the actual EGR quantity and an advance correction quantity based upon the oxygen density. Whether this total correction quantity is made in the retard direction or in the advance direction may be determined by an experiment. In the first embodiment, as shown in FIG. 5, it is made in the advance direction. The target pilot injection quantity and the target injection pressure are made in the same way as the above.

In the first embodiment, the air excess rate and the EGR rate are estimated based upon the intake air quantity and the EGR quantity, but a correction quantity table map is respectively set to the intake air quantity and the EGR quantity, and thereby the air excess rate and the EGR rate can directly be corrected by the intake air quantity and the EGR quantity.

Figure 24:
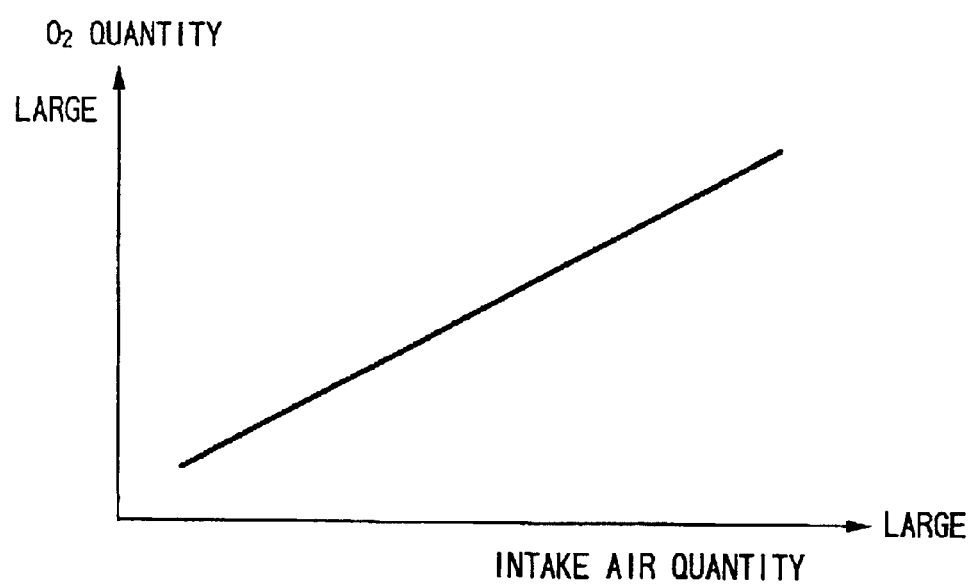
FIG. 24 is a view showing a relationship between an intake air quantity and an oxygen quantity.

As shown in FIG. 24, since the intake air quantity has a proportional relationship with the oxygen quantity, a determination of the oxygen quantity leads to a determination of the air excess rate. Accordingly, when a correction quantity table map is respectively set to the oxygen quantity and the oxygen density, it can be directly corrected by the oxygen quantity instead of the air excess rate.

The entire contents of Japanese Patent Application No. 2001-327236, filed Oct. 25, 2001 to which priority is claimed, are incorporated herein by reference.

While only selected embodiments have been chosen to illustrate the present invention, it will be apparent to those skilled in the art from this disclosure that various change and modification can be made herein without departing from the scope of the invention as defined with reference to the appended claims. Furthermore, the foregoing description of the embodiments according to the present invention are provided for illustration only, and not for the purpose of limiting the invention as defined by the appended claims and their equivalents.

What is claimed:
1. An apparatus for controlling an internal combustion engine comprising:
   a fuel injection valve which directly injects fuel into a combustion chamber for the internal combustion engine; and a fuel injection control unit which, when a reduction demand of an air excess rate in the combustion chamber occurs, variably controls a fuel injection state of the fuel injection valve to keep constant a crank angle position, where a heat generation rate in the combustion chamber is maximized.

2. An apparatus according to claim 1, wherein the fuel injection control unit advances an injection timing of a main injection of the fuel injection valve as the air excess rate is reduced.

3. An apparatus according to claim 1, wherein the fuel injection control unit increases an injection quantity in a pilot injection of the fuel injection valve prior to a main injection of the fuel injection valve as the air excess rate is reduced.

4. An apparatus according to claim 1, wherein the fuel injection control unit increases an injection pressure of the fuel injection valve as the air excess rate is reduced.

5. An apparatus according to claim 1, further comprising:

an EGR mechanism which recirculates an exhaust gas into an intake system of the internal combustion engine, wherein the fuel injection control unit controls the fuel injection state of the fuel injection valve, based on an EGR control quantity of the EGR mechanism in addition to the reduction demand of the air excess rate so that the crank angle position where the heat generation rate is maximized is kept constant.

6. An apparatus according to claim 5, wherein the fuel injection control unit controls an injection timing of a main injection of the fuel injection valve based on the air excess rate and an EGR rate which is a ratio of an EGR quantity of the EGR mechanism to an intake air quantity into the combustion chamber.

7. An apparatus according to claim 5, wherein the fuel injection control unit controls an injection quantity in a pilot injection of the fuel injection valve prior to a main injection of the fuel injection valve based on the air excess rate and an EGR rate which is a ratio of an EGR quantity of the EGR mechanism to an intake air quantity into the combustion chamber.

8. An apparatus according to claim 5, wherein the fuel injection control unit controls an injection pressure of the fuel injection valve based on the air excess rate and an EGR rate which is a ratio of an EGR quantity of the EGR mechanism to an intake air quantity into the combustion chamber.

9. An apparatus according to claim 5, wherein the fuel injection control unit advances an injection timing of a main injection of the fuel injection valve as an EGR quantity of the EGR mechanism is reduced.

10. An apparatus according to claim 5, wherein the fuel injection control unit increases an injection quantity of the fuel injection valve as an EGR quantity of the EGR mechanism is reduced.

11. An apparatus according to claim 5, wherein the fuel injection control unit increases an injection pressure of the fuel injection valve as the EGR quantity of the EGR mechanism is reduced.

12. An apparatus according to claim 1, wherein the fuel injection control unit controls the fuel injection state of the fuel injection valve, based on an oxygen density of a mixture in the combustion chamber in addition to the reduction demand of the air excess rate so that the crank angle position, where the heat generation rate is maximized, is kept constant.

13. An apparatus according to claim 12, wherein the fuel injection control unit advances an injection timing of a main injection of the fuel injection valve as the oxygen density of the mixture in the combustion chamber is reduced.

14. An apparatus according to claim 12, wherein the fuel injection control unit increases an injection quantity in a pilot injection of the fuel injection valve prior to a main injection of the fuel injection valve as the oxygen density of the mixture in the combustion chamber is reduced.

15. An apparatus according to claim 12, wherein the fuel injection control unit increases an injection pressure of the fuel injection valve as the oxygen density of the mixture in the combustion chamber is reduced.

16. An apparatus according to claim 1, further comprising:

an exhaust gas purification mechanism disposed in an exhaust passage to purify exhaust gas components in exhaust gases from the internal combustion engine; and an air excess rate control unit which reduces the air excess rate during rising of a temperature of the exhaust gas purification mechanism or regenerating of the exhaust gas purification mechanism.

17. An apparatus for controlling an internal combustion engine comprising:

a fuel injection means for directly injecting fuel into a combustion chamber for the internal combustion engine; and a fuel injection control means for, when a reduction demand of an air excess rate in the combustion chamber occurs, variably controlling a fuel injection state of the fuel injection valve to keep constant a crank angle position, where a heat generation rate in the combustion chamber is maximized.

18. A method for controlling an internal combustion engine comprising:

directly injecting fuel into a combustion chamber for the internal combustion engine by a fuel injection valve; and variably controlling a fuel injection state, when a reduction demand of an air excess rate in the combustion chamber occurs, of the fuel injection valve to keep constant a crank angle position, where a heat generation rate in the combustion chamber is maximized.

* * * * *